(12) United States Patent
Buscaino et al.

(10) Patent No.: US 12,492,984 B2
(45) Date of Patent: Dec. 9, 2025

(54) METHOD AND APPARATUS FOR COHERENT SPREAD SPECTRUM OPTICAL SPECTROSCOPY

(71) Applicant: CIENA CORPORATION, Hanover, MD (US)

(72) Inventors: Brandon Taylor Buscaino, Palo Alto, CA (US); Mohammad Ebrahim Mousa Pasandi, Ottawa (CA); Kim Byron Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 221 days.

(21) Appl. No.: 18/313,864

(22) Filed: May 8, 2023

(65) Prior Publication Data
US 2024/0125694 A1   Apr. 18, 2024

Related U.S. Application Data

(60) Provisional application No. 63/379,205, filed on Oct. 12, 2022.

(51) Int. Cl.
*G01N 21/31* (2006.01)
*G01N 33/483* (2006.01)

(52) U.S. Cl.
CPC ......... *G01N 21/31* (2013.01); *G01N 33/4833* (2013.01)

(58) Field of Classification Search
CPC ............... G01N 21/31; G01N 33/4833; G01N 2201/0691; G01N 21/3563; G01N 21/359; G01N 21/49
See application file for complete search history.

(56) References Cited

U.S. PATENT DOCUMENTS

| | | | | |
|---|---|---|---|---|
| 5,086,229 A | * | 2/1992 | Rosenthal | G01N 21/359 250/339.04 |
| 5,188,108 A | * | 2/1993 | Secker | A61B 5/14551 600/475 |
| 6,002,480 A | * | 12/1999 | Izatt | G01B 9/02072 356/479 |

(Continued)

FOREIGN PATENT DOCUMENTS

| | | | | |
|---|---|---|---|---|
| EP | 3350541 A1 | | 7/2018 | |
| FR | 2994599 A1 | * | 2/2014 | ........... A61B 5/0066 |
| WO | WO-2015084270 A1 | * | 6/2015 | ........... A61B 5/0095 |

OTHER PUBLICATIONS

"Amendment Under Article 34 Response for Application No. PCT/US2023/076574", Jul. 15, 2024, 8 pages.

(Continued)

*Primary Examiner* — Mohamed K Amara
(74) *Attorney, Agent, or Firm* — Guntin & Gust, PLC; Kenneth S. Kwan

(57) ABSTRACT

Aspects of the subject disclosure may include, for example, generating one or more first optical signals, launching the first optical signal into a medium, receiving from the medium one or more second optical signals, mixing the one or more second optical signals with one or more third optical signals to generate one or more mixed signals, obtaining one or more electrical signals from the mixed signal, and generating one or more point spread functions from the one or more electrical signals. Other embodiments are disclosed.

20 Claims, 15 Drawing Sheets

(56) References Cited

U.S. PATENT DOCUMENTS

| | | | | |
|---|---|---|---|---|
| 6,285,514 | B1* | 9/2001 | O'Meara | G01D 5/26 |
| | | | | 359/721 |
| 6,480,285 | B1* | 11/2002 | Hill | G02B 21/006 |
| | | | | 356/497 |
| 7,231,243 | B2* | 6/2007 | Tearney | A61B 5/6885 |
| | | | | 600/407 |
| 8,103,329 | B2 | 1/2012 | Fomitchov et al. | |
| 10,502,666 | B2* | 12/2019 | Fine | G02B 21/0008 |
| 10,962,751 | B2* | 3/2021 | Alfano | G02F 1/3536 |
| 11,181,468 | B2* | 11/2021 | Shim | G01N 21/1702 |
| 11,206,985 | B2* | 12/2021 | Alford | G01N 21/49 |
| 11,525,666 | B2* | 12/2022 | Winkelmann, Jr. | |
| | | | | G01B 9/02044 |
| 12,270,646 | B2* | 4/2025 | Benavides | G01B 9/02091 |
| 2002/0063923 | A1 | 5/2002 | Coppeta et al. | |
| 2003/0085338 | A1 | 5/2003 | Hall et al. | |
| 2004/0155665 | A1* | 8/2004 | Arnone | G01N 21/3563 |
| | | | | 250/341.1 |
| 2005/0168735 | A1* | 8/2005 | Boppart | G01N 21/65 |
| | | | | 356/301 |
| 2006/0058685 | A1* | 3/2006 | Fomitchov | B82Y 10/00 |
| | | | | 600/476 |
| 2006/0066839 | A1 | 3/2006 | Payton | |
| 2007/0112273 | A1* | 5/2007 | Rogers | G01N 21/359 |
| | | | | 600/475 |
| 2007/0195330 | A1 | 8/2007 | Ohashi et al. | |
| 2008/0070323 | A1 | 3/2008 | Hess et al. | |
| 2009/0306993 | A1 | 12/2009 | Wuebbolt et al. | |
| 2010/0056928 | A1* | 3/2010 | Zuzak | G01J 3/2823 |
| | | | | 356/302 |
| 2010/0155622 | A1 | 6/2010 | Da et al. | |
| 2011/0118575 | A1 | 5/2011 | Lloyd et al. | |
| 2011/0318021 | A1 | 12/2011 | Zhou | |
| 2013/0079639 | A1 | 3/2013 | Hoctor et al. | |
| 2014/0254728 | A1 | 9/2014 | Jones et al. | |
| 2015/0051498 | A1* | 2/2015 | Darty | G01J 3/2803 |
| | | | | 600/407 |
| 2017/0303829 | A1 | 10/2017 | Cohen et al. | |
| 2018/0299251 | A1* | 10/2018 | Liba | G02B 27/48 |
| 2020/0158490 | A1* | 5/2020 | Ogawa | G01B 9/02012 |
| 2020/0323467 | A1 | 10/2020 | Ray et al. | |
| 2022/0042849 | A1 | 2/2022 | Hendrickson et al. | |
| 2022/0164924 | A1 | 5/2022 | Millar et al. | |
| 2024/0129054 | A1 | 4/2024 | Buscaino et al. | |

OTHER PUBLICATIONS

"International Search Report and Written Opinion for Application No. PCT/US2023/076574", 10 pages.

"International Search Report & Written Opinion for Application No. PCT/US2023/076570", Jan. 4, 2024, 11 pages.

Chen, Nan Guang, et al., "Time-resolved optical measurements with spread spectrum excitation", Opt Lett. Oct. 2002 ; 27(20): 1806-1808., Oct. 27, 2002, 6 Pages.

Cooper, Robert J., et al., "MONSTIR II: A 32-channel, multispectral, time-resolved optical tomography system for neonatal brain imaging", https://www.researchgate.net/publication/262604968, May 2014, 11 Pages.

Guo, Zhen , et al., "High Sensing Accuracy Realisation With Millimetre/Sub-Millimetre Resolution in Optical Frequency Domain Reflectometer", Journal of Lightwave Technology, vol. 40, No. 12, Jun. 15, 2022, Jun. 15, 2022, 7 Pages.

Hasnain, Ali , et al., "Laplace-domain diffuse optical measurement", DOI: 10.1038/s41598-018-30353-5, Aug. 14, 2018, 8 Pages.

Ip, Ezra , et al., "Coherent detection in optical fiber systems", vol. 16, No. 2 / Optics Express 753, Jan. 9, 2008, 39 Pages.

Mehta, Kalpesh , et al., "Spread spectrum time-resolved diffuse optical measurement system for enhanced sensitivity in detecting human brain activity", https://www.spiedigitallibrary.org/journals/Journal-of-Biomedical-Optics, Apr. 6, 2017, 8 Pages.

Papadimitriou, Konstantinos I., et al., "A spread spectrum approach to time-domain near-infrared diffuse optical imaging using inexpensive optical transceiver modules", https://doi.org/10.1364/BOE.9.002648, Apr. 23, 2018, 16 Pages.

Papadimitriou, Konstantinos I., "Dual wavelength spread-spectrum time-resolved diffuse optical instrument for the measurement of human brain functional responses", https://doi.org/10.1364/BOE.393586, Jun. 2, 2020, 14 Pages.

Puszka, Agathe , et al., "Spatial resolution in depth for time-resolved diffuse optical tomography using short source-detector separations", vol. 6, No. 1 | DOI:10.1364/BOE.6.000001 | Biomedical Optics Express 1, Dec. 2, 2014, 10 Pages.

Sutin, Jason , et al., "Time-domain diffuse correlation spectroscopy", http://dx.doi.org/10.1364/OPTICA.3.001006, Sep. 6, 2016, 8 Pages.

Zhang, Qiang , et al., "Pseudo-random single photon counting: a highspeed implementation", vol. 1, No. 1 / Biomedical Optics Express 41, Jul. 13, 2020, 6 Pages.

"International Preliminary Report on Patentability for Appln. No. PCT/US2023/076574", Nov. 5, 2024, 18 pages.

Zhang, Xiaofeng , "Instrumentation in Diffuse Optical Imaging", Photonics 2014, 1, 9-32, Mar. 20, 2014, 24 pages.

"PCT/US2023/076574 International Search Report", mailed Feb. 8, 2024.

* cited by examiner

METHOD AND APPARATUS FOR COHERENT SPREAD SPECTRUM OPTICAL SPECTROSCOPY

CROSS REFERENCE TO RELATED APPLICATIONS

The present application claims the benefit of priority to U.S. Provisional Application No. 63/379,205 filed on Oct. 12, 2022. All sections of the aforementioned application are incorporated herein by reference in their entirety.

FIELD OF THE DISCLOSURE

The subject disclosure relates to a method and apparatus for coherent spread spectrum optical spectroscopy.

BACKGROUND

Diffuse optical spectroscopy (DOS) is a known method of optical imaging where an optical signal is transmitted through a turbid or diffusing media and information or properties about the media are extracted from light collected after passing through or being reflected. For medical usage, the optical wavelengths used for DOS are in the infrared region (e.g., 600 nm-1000 nm or other spectral regions) because of the low absorption of water and the distinct absorption profiles of tissue components such as lipids, fats, collagen, oxyhemoglobin, and deoxyhemoglobin (FIG. 1) at those wavelengths. Diffuse optical spectroscopy is a subcategory of the broad optical techniques called near-infrared spectroscopy (NIRS). For medical applications, DOS is used to determine the concentration of these components and extract medical information, such as oxygen concentration, likelihood of tumors, and neural stimulation. In some cases, multiple optodes (either an optical source or detector) are placed around a tissue and information is gathered sequentially to determine spatial information about the sample. This technique is referred to as diffuse optical tomography (DOT).

FIG. 2. shows a typical DOS setup where light is shone into a tissue sample and is then collected by a detector fiber. Some of the light travels through the shortest possible path and is typically labeled "ballistic." Light that propagates deeper into the tissue is typically labeled "snake". And the light that propagates the deepest into the tissue is often called "diffuse".

There are three general known DOS techniques: Continuous wave (CW-DOS), Frequency-Domain (FD-DOS), and Time-Domain (TD-DOS). These are schematically shown in FIG. 3. In CW-DOS, one or more CW lasers are shined into the tissue and the total light intensity is measured at the detector. The total intensity will fluctuate when the tissue concentration changes, typically when oxygen enters or leaves the blood in the tissue, allowing information to be extracted. CW-DOS frequently cannot discriminate between photons that travel different path lengths in tissue. In FD-DOS, one or multiple lasers are amplitude modulated at frequencies from 10 MHz-1 GHz. The intensity and phase are measured in a detector and used along with advanced tissue modeling to extract absorption and scattering coefficients. This technique cannot typically discriminate between ballistic, snake, and diffuse optical fields.

In a typical implementation of TD-DOS, a pulsed laser is incident at the source and after propagating through the medium is received at the detector. As the light propagates through the diffuse media, the pulse spreads out in time. This temporal distribution is known as the temporal point spread function (TPSF) and can be used to discriminate between ballistic, snake, and diffuse received light. Simply, the light that is received first must have traveled the shortest distance (ballistic), then the snake light, and followed by heavily diffused light. In TD-DOS, it is typically necessary to use a detector with very good sensitivity in order to compensate for high tissue loss, especially for the heavily diffused fields. Detector options are photomultiplier tubes (PMTs), avalanche photodiodes (APDs), or single-photon avalanche photodiodes (SPADs). These detectors are then coupled with a time-correlated single photon counter (TC-SPC) in order to estimate the TPSF with high signal-to-noise ratio (SNR) and fine temporal resolution (10-100 ps). TD-DOS is recognized as the most advanced DOS technique because it requires specialized equipment in the pulsed laser, detector, and TC-SPC.

One limitation to the use of a TC-SPC is that the acquisition time of a signal can be quite long. The reason for this is that the TC-SPC relies on time-gating to ensure that only one photon is detected in the allotted time-interval to ensure accurate histogramming to produce the TPSF. If too many photons are received in the allotted time-interval, a pile-up effect occurs, skewing the received TPSF. Consequently, this method requires many pulses to build up a TPSF, even if the pulse repetition rate is quite fast. In addition, pulsed lasers can sometimes take many minutes to warm up and stabilize, increasing measurement time.

Diffuse Optical Tomography (DOT) is an extension of DOS where multiple source-detector pairs can be used to reconstruct spatial information about a tissue sample. Increasing the number of source-detector pairs can thus give a larger imaging area or finer image resolution. One state-of-the-art system is the MONSTIR II system developed at University College London, that is a time-resolved 32×32 system that uses an optical switch at the transmitter and time-multiplexed data acquisition to resolved 992 TPSFs. The system uses 32 VOAs and PMTs as well as 4 TC-SPCs. In addition, 4 wavelengths are used (controlled by an acousto-optic tunable filter). The addition of other wavelengths is thus extended via time-multiplexing, reducing the acquisition time. (Cooper, R. J., Magee, E., Everdell, N., Magazov, S., Varela, M., Airantzis, D., Gibson, A. P. and Hebden, J. C., 2014. *MONSTIR II. a 32-channel, multispectral, time-resolved optical tomography system for neonatal brain imaging. Review of Scientific Instruments*, 85 (5), p. 053105.)

For depth-resolved optical imaging methods such as TD-DOS it is sometime unnecessary to use distinct source-detector locations. For example, the null source-detector pair configuration is a reflectance-mode technique where the same optical fiber sends transmits and receives the optical probe. In some cases, having very short distances (or null distance) between source and detector can improve the depth sensitivity in the tissue (Puszka, A., Di Sieno, L., Dalla Mora, A., Pifferi, A., Contini, D., Planat-Chrétien, A., Koenig, A., Boso, G., Tosi, A., Hervé, L. and Dinten, J. M., 2015. Spatial resolution in depth for time-resolved diffuse optical tomography using short source-detector separations. Biomedical optics express, 6 (1), pp. 1-10.)

Another closely related imaging modality to DOS is diffuse correlation spectroscopy (DCS). A canonical DCS setup is similar to DOS in that light is shone into tissue and then detected after propagation. In DCS, a highly coherent CW laser is used as the input and the received signal intensity is measured over long time periods (ms to sec to min). Because the CW laser is highly coherent, small changes in the tissue path lengths, frequently caused by blood flow, can cause the interference pattern at the detector to change, causing temporal speckle. The spectral or temporal content of slight changes in intensity at the detector can be correlated with changes in tissue properties such as changes in blood flow velocity. Recently, DCS and DOS were combined in a traditional pulsed-laser/TC-SPC TD-DOS system, shown in FIG. 4. The TPSF from the TD-DOS system was collected and stored over longer time scales (up to 10 ms). The TPSF intensity was integrated over different regions (corresponding to either ballistic, purple, or diffuse, green) and then correlated over the longer time scales to determine depth-dependent blood flow velocities.

Due to the complexity and cost of the components in most TD-DOS systems, there are very few commercial systems. The exceptions are the TRS-20X system by Hamamatsu, which appears to be discontinued, and the PICOXEA TCSPC Analyser by Aurea Technology, shown in FIG. 5. However, there exist many specialized research laboratory setups that can perform TD-DOS experiments. These setups still require pico-second pulsed laser sources and expensive detectors.

A recently developed technique for TD-DOS is called the spread-spectrum technique (SS-TD-DOS). In SS-TD-DOS, instead of a pulsed laser, a coherent CW laser is intensity modulated with a pseudo-random bit sequence (PRBS) with high autocorrelation properties, for example a maximal length sequence (MLS). This light is transmitted through the tissue and then captured with an intensity detector. The electrical signal is then correlated with the input signal, which produces the desired TPSF. One such system is shown in FIG. 6. There are two research groups that have developed these techniques over the past 10-20 years.

As early as 2002, the spread-spectrum technique has been used for DOS (Chen, N. G. and Zhu, Q., 2002. *Time-resolved optical measurements with spread spectrum excitation. Optics letters*, 27 (20), pp. 1806-1808.). In 2008, Chen et all demonstrated SS-TD-DOS with a 2.5 Gb/s transmitter, coupled with a 9×4 (source x detector) DOT system to resolve TPSF features on the order of 800 ps. 400 ps resolution should have been possible, but they were limited by the APD bandwidth. The spread-spectrum transmission technique can be coupled with traditional single-photon counting techniques as well as used with higher bit rates up to 10 Gb/s (Zhang, Q., Chen, L. and Chen, N., 2010. *Pseudo-random single photon counting: a high-speed implementation. Biomedical optics express*, 1 (1), pp. 41-46.).

In 2017 and 2018, these ideas were slightly extended to include the use of an external FPGA to perform the required autocorrelation of the PRBS. In addition, the timing resolution was reduced to the theoretical value of 400 ps for a 2.5 Gb/s transmitter (Mehta, K. B., Hasnain, A., Zhou, X., Luo, J., Penney, T. B. and Chen, N., 2017. *Spread spectrum time-resolved diffuse optical measurement system for enhanced sensitivity in detecting human brain activity. Journal of biomedical optics*, 22 (4), p. 045005.). In addition, this group has explored the use of Laplace domain filtering to reduce the collected TPSF information to a subset of the data at specific Laplace frequencies while maintaining accurate timing information (Hasnain, A., Mehta, K., Zhou, X., Li, H. and Chen, N., 2018. *Laplace-domain diffuse optical measurement. Scientific reports*, 8 (1), pp. 1-8.)

Other groups have used commercially available transceivers. For example, one group has used an 850 nm VCSEL-based 10 Gb/s Avago transceiver along with the spread-spectrum technique for SS-TD-DOS. This measurement, however, used a TC-SPC, and thus required extensive averaging and post-processing steps (Papadimitriou, K. I., Dempsey, L. A., Hebden, J. C., Arridge, S. R. and Powell, S., 2018. *A spread spectrum approach to time-domain near-infrared diffuse optical imaging using inexpensive optical transceiver modules. Biomedical Optics Express*, 9 (6), pp. 2648-2663.). This system was extended to two wavelengths (680 nm and 950 nm) in 2020 and used in a clinical trial to determine relative oxygen concentration changes in subjects (Papadimitriou, K. I., Rosas, E. E. V., Zhang, E., Cooper, R. J., Hebden, J. C., Arridge, S. R. and Powell, S., 2020. *Dual wavelength spread-spectrum time-resolved diffuse optical instrument for the measurement of human brain functional responses. Biomedical Optics Express*, 11 (7), pp. 3477-3490.).

Coherent detection is a technique in which both the phase and amplitude of a signal is measured. Commonly used coherent detection schemes are shown in FIG. 7. Information may be encoded in either amplitude or the phase of the transmitted light (equivalently the in-phase and quadrature components of the electric field). Similarly, the coherent detection process may be a heterodyne technique, whereby the LO is offset by an intermediate frequency (IF) from the transmitted light. Or the detected light may be detected via a homodyne receiver, where the IF is close to zero.

Heterodyne detection has been explored in the past as a viable technique of probing tissue such as chicken breast to determine scattering properties, but the methods were limited to single-quadrature heterodyne detection with continuous wave light in a transmission geometry similar to optical coherence tomography (Chan, K. P., Devaraj, B., Yamada, M. and Inaba, H., 1997. Coherent detection techniques in optical imaging of tissues. *Physics in Medicine & Biology*, 42 (5), p. 855.).

OFDR is known, as shown in FIG. 8. A first optical signal is coupled into the medium. A second optical signal is extracted from the medium. A third optical signal is mixed with a second optical signal and detected to form an electrical beat product. In this method, the narrow-spectrum source is frequency swept on a time scale of microseconds to milliseconds. This is distinct from broad modulation.

Another technique called optical coherence tomography (OCT) is similar in that it is a near-infrared optical imaging modality, but relies on low-coherence interferometry to achieve very small imaging resolution (~1-10 um) but can only penetrate up to <1 cm. DOS, on the other hand, cannot achieve the resolution of OCT, as the resolution is closer to 1 mm, but it can resolve images much deeper in tissues (several cm) and is typically used with multiple wavelengths to give spectroscopic information about the sample.

The optical source used for OCT is either a frequency-swept source in swept-source OCT (SS-OCT), which is similar to OFDR, or a broadband optical spectrum created with an LED, or more commonly, a superluminescent diode, known as spectral domain OCT (SD-OCT). Schematic diagrams for these techniques are shown in FIG. 9.

BRIEF DESCRIPTION OF THE DRAWINGS

Reference will now be made to the accompanying drawings, which are not necessarily drawn to scale, and wherein.

DETAILED DESCRIPTION

Figure 1:
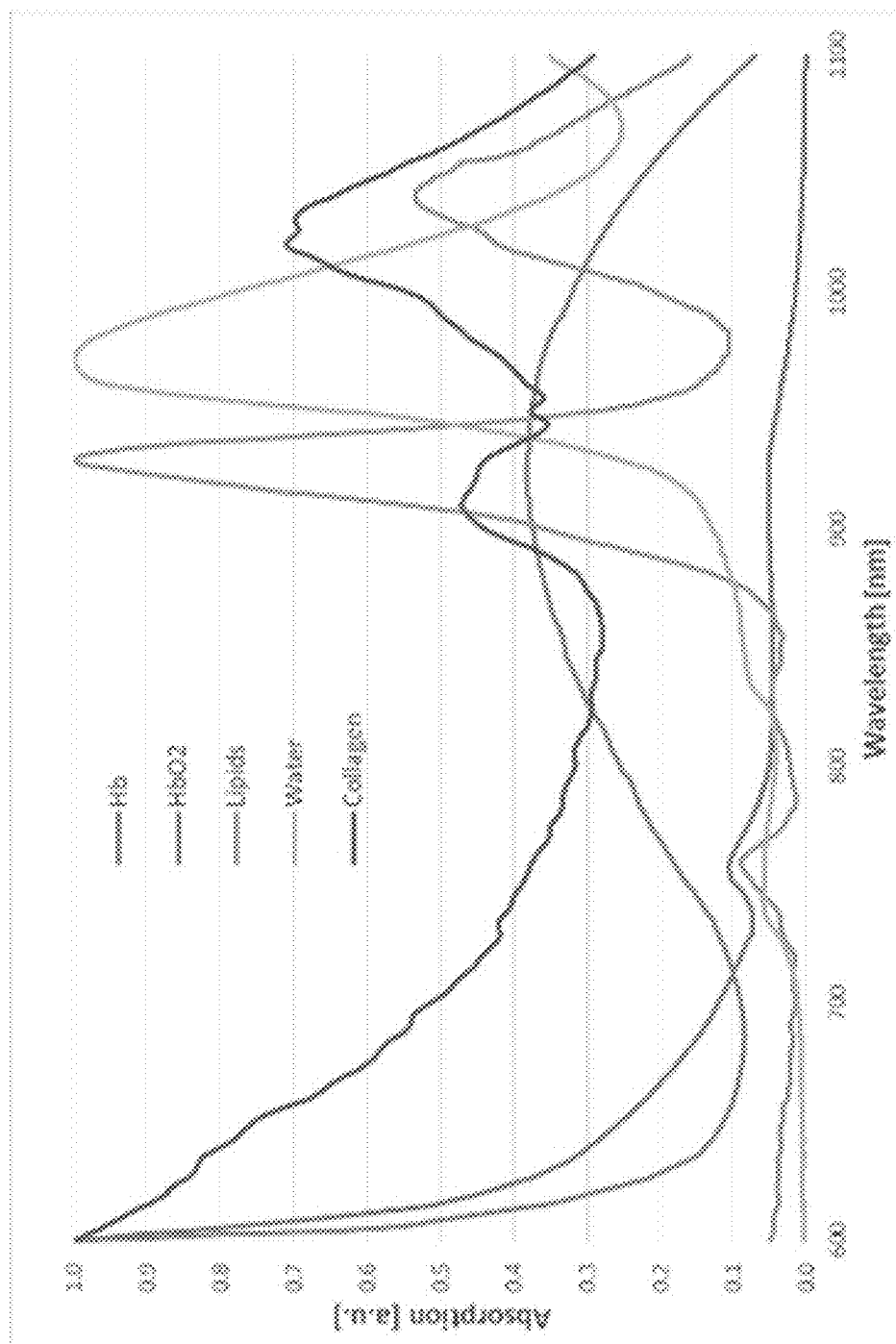
FIG. 1 is a block diagram illustrating an exemplary, non-limiting embodiment of an absorption profile of various tissue components in near-infrared in accordance with various aspects described herein.
Figure 2:
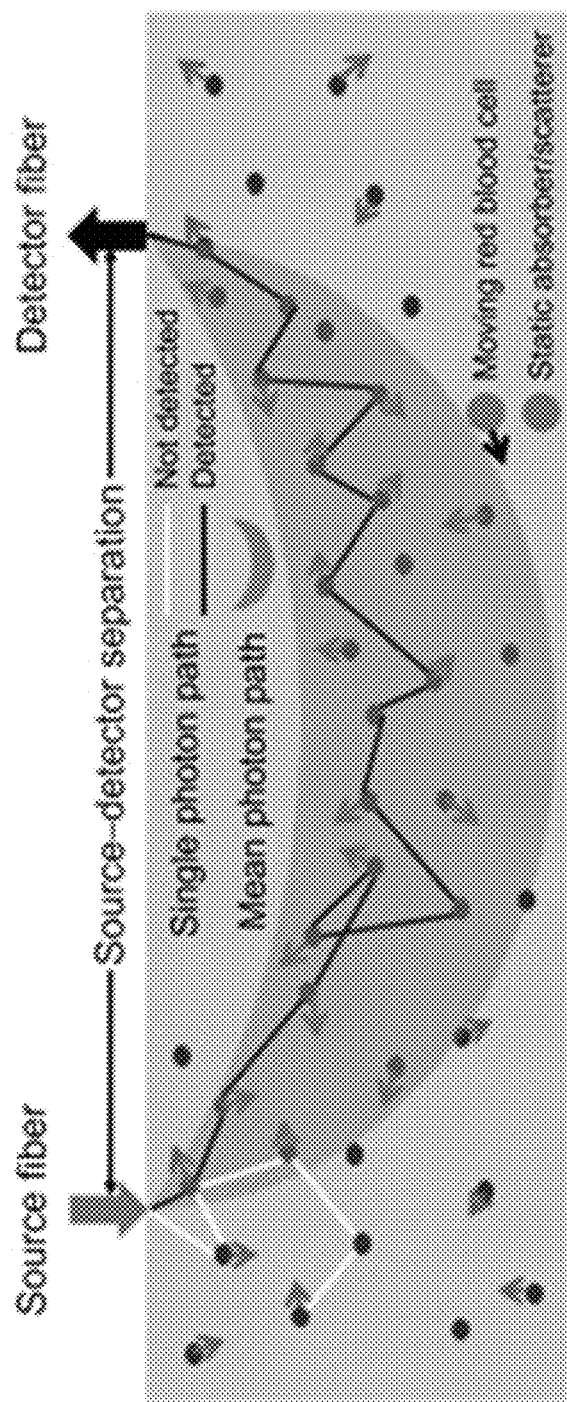
FIG. 2 is a block diagram illustrating an example, non-limiting embodiment of a DOS setup in accordance with various aspects described herein. (See S. A. Carp, Q. Fang, in Pathobiology of Human Disease, 2014).
Figure 3:
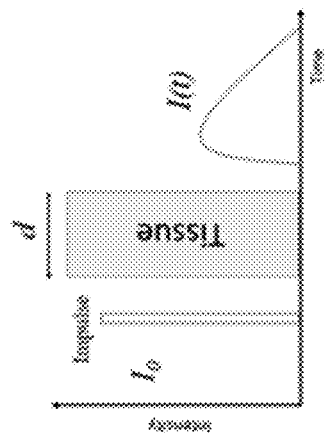
FIG. 3 is a block diagram illustrating an example, non-limiting embodiment of from left-to-right: CW-DOS, FD-DOS, TD-DOS in accordance with various aspects described herein. (See https://nirx.net/).
Figure 3:
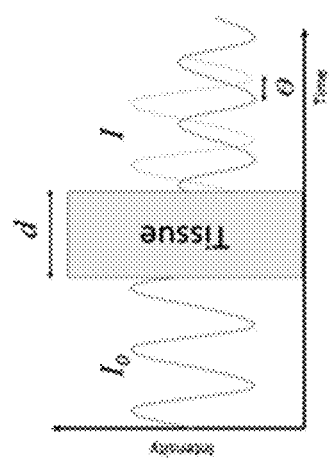
Figure 3:
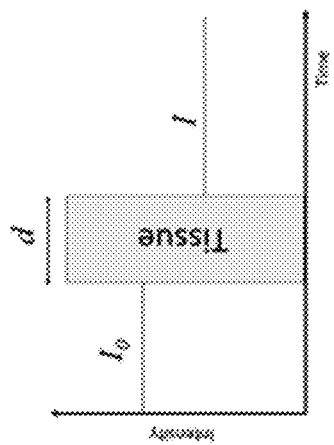
Figure 4:
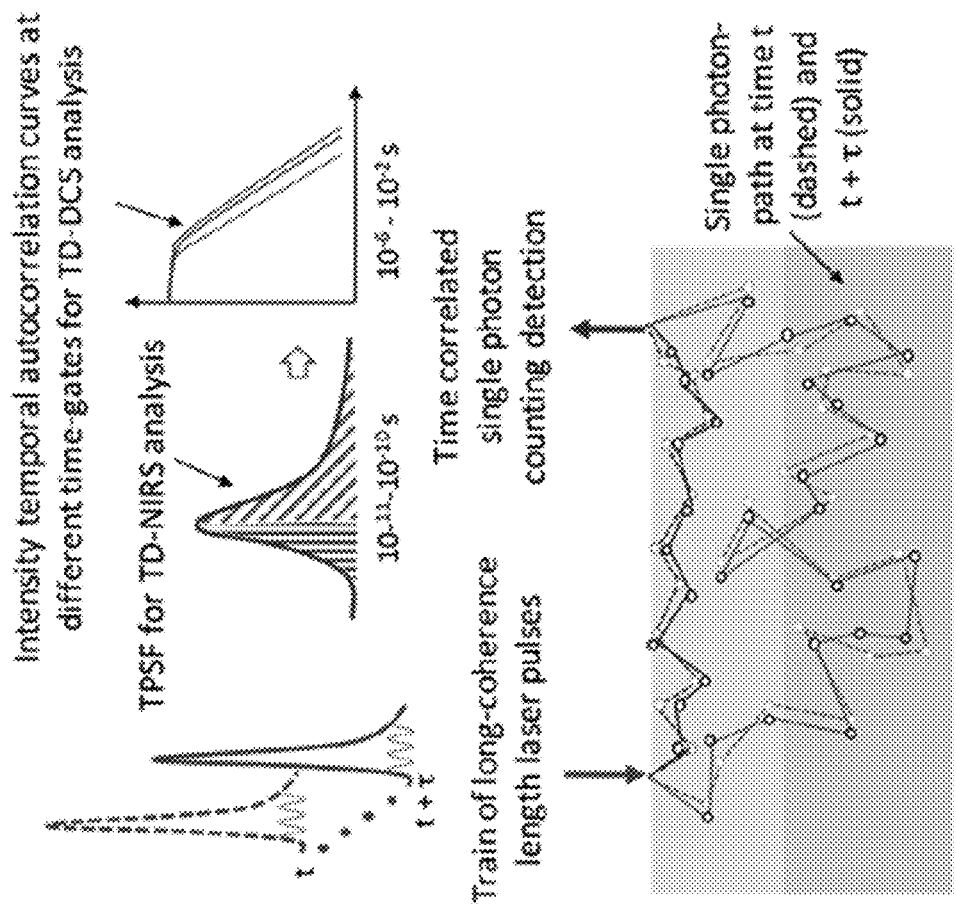
FIG. 4 is a block diagram illustrating an example, non-limiting embodiment of a combined TD-DOS and TD-DCS system in accordance with various aspects described herein. (See Sutin, J., Zimmerman, B., Tyulmankov, D., Tamborini, D., Wu, K. C., Selb, J., Gulinatti, A., Rech, I., Tosi, A., Boas, D. A. and Franceschini, M. A., 2016. Time-domain diffuse correlation spectroscopy. Optica, 3 (9), pp. 1006-1013.).
Figure 5:
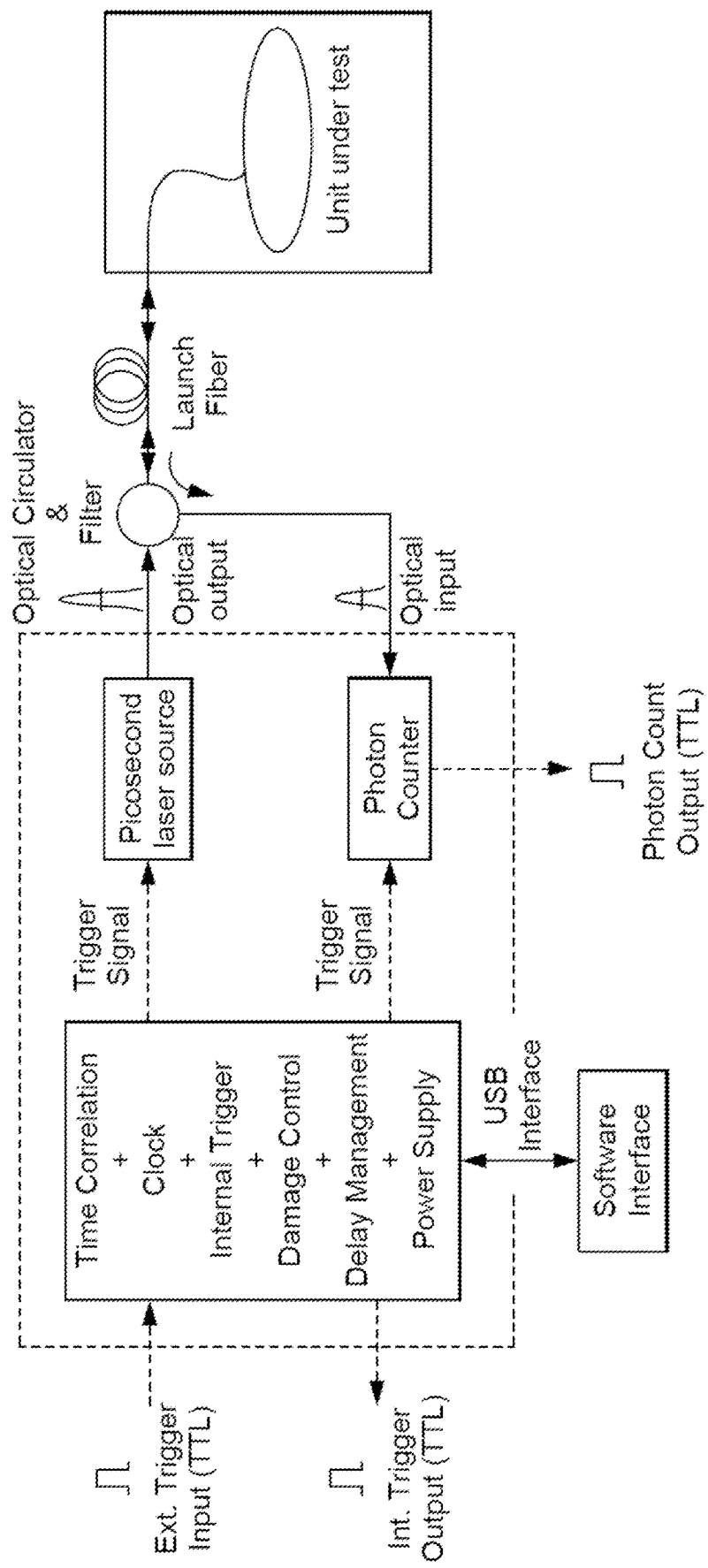
FIG. 5 is a block diagram illustrating an example, non-limiting embodiment of a system demonstrating a time-resolved detection system that can be used for TD-DOS as well as OTDR, shown here in accordance with various aspects described herein. (See http://aureatechnology.com/en/products/picoxea.htm).
Figure 6:
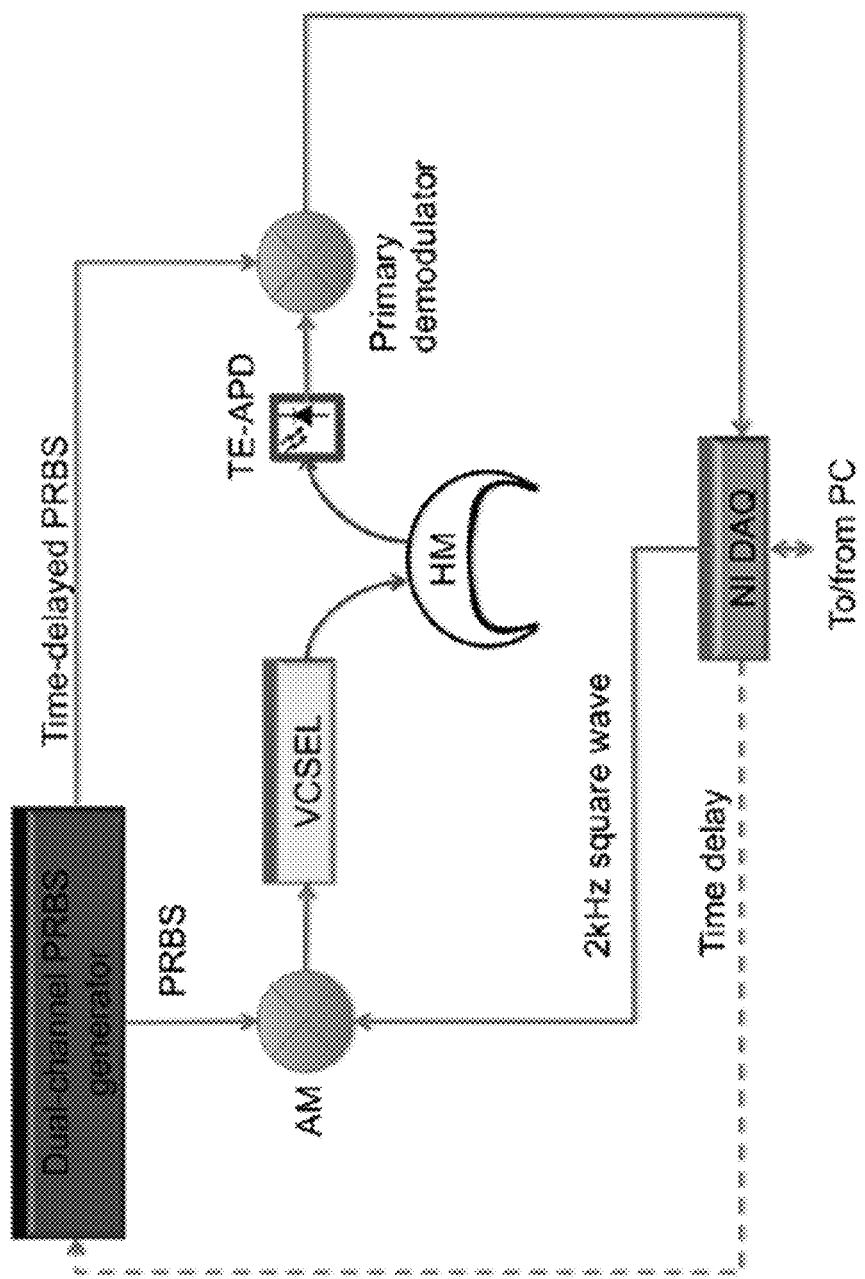
FIG. 6 is a block diagram illustrating an example, non-limiting embodiment of an SS-TD-DOS system in accordance with various aspects described herein. (See Mehta, K. B., Hasnain, A., Zhou, X., Luo, J., Penney, T. B. and Chen, N., 2017. Spread spectrum time-resolved diffuse optical measurement system for enhanced sensitivity in detecting human brain activity. Journal of Biomedical Optics, 22 (4), p. 045005.).
Figure 7:
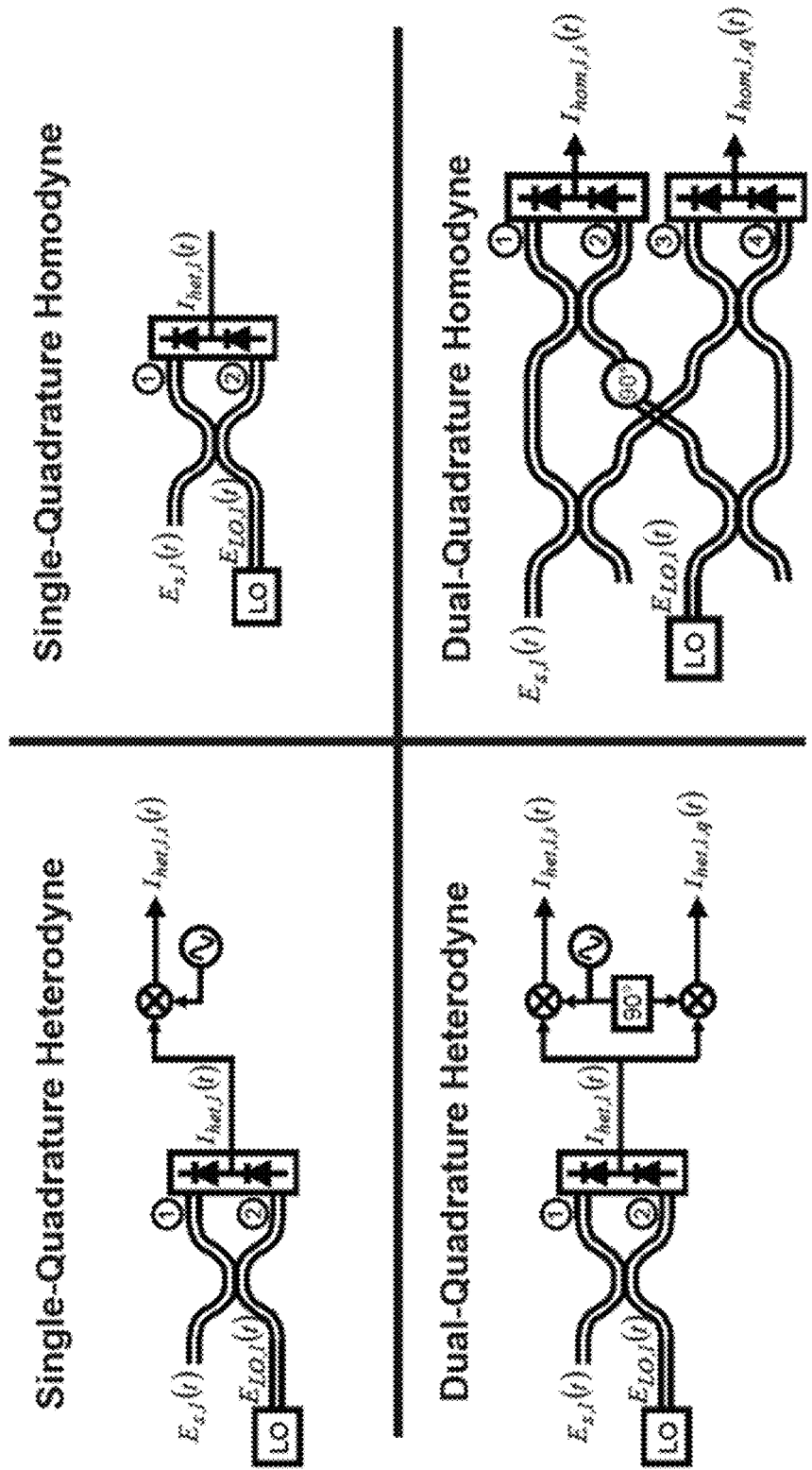
FIG. 7 is a block diagram illustrating an example, non-limiting embodiment of coherent receiver configurations, partially altered from: Ip, E., Lau, A. P. T., Barros, D. J. and Kahn, J. M., 2008. Coherent detection in optical fiber systems. Optics express, 16 (2), pp. 753-791.
Figure 8:
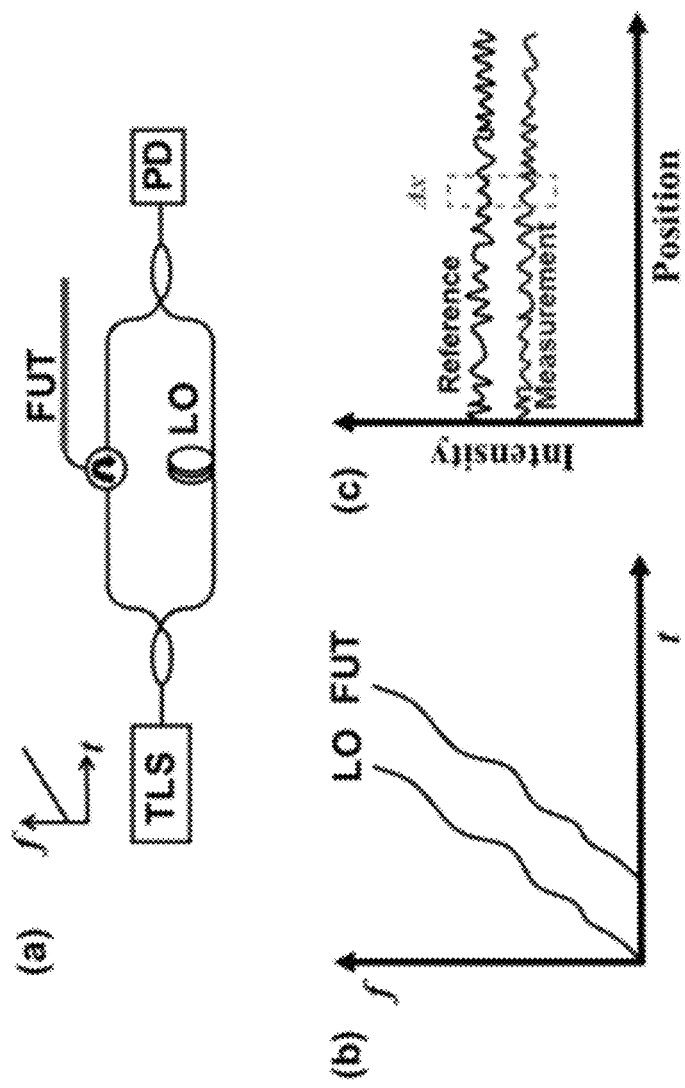
FIG. 8 is a block diagram illustrating an example, non-limiting embodiment of an Optical Frequency Domain Reflectometry (Guo, Z., Yan, J., Han, G., Greenwood, D., Marco, J. and Yu, Y., 2022. High Sensing Accuracy Realisation with Millimetre/sub-Millimetre Resolution in Optical Frequency Domain Reflectometer. Journal of Lightwave Technology.)
Figure 9:
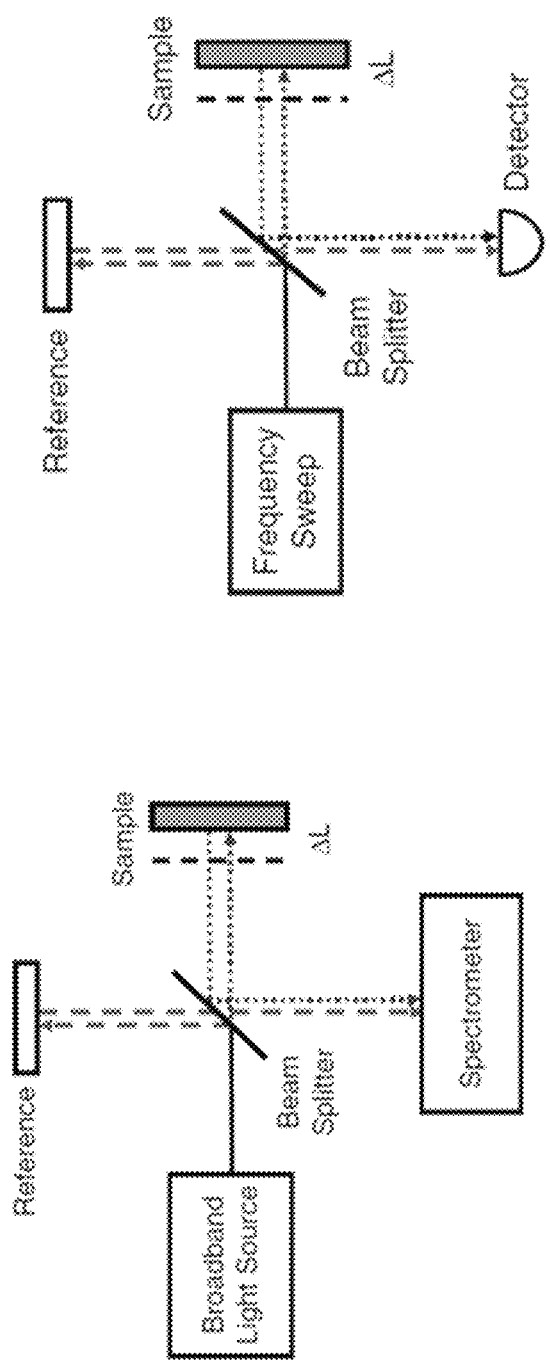
FIG. 9 is a block diagram illustrating an example, non-limiting embodiment of a schematic for SD-OCT (Left), which uses a broadband optical source and a spectrometer as a detector. (Right) Schematic for SS-OCT, which uses a frequency-swept source and a simple photodetector. (Drexler, W. and Fujimoto, J. G. eds., 2015. Optical coherence tomography: technology and applications (Vol. 2). Berlin: Springer.)

The subject disclosure describes, among other things, illustrative embodiments for coherent spread spectrum optical spectroscopy. Other embodiments are described in the subject disclosure.

One or more aspects of the subject disclosure include a method for generating one or more first optical signals by modulating light to form a broad substantially-coherent optical spectrum, launching the first optical signal into a medium that has a characteristic of being bulk and diffusing, receiving from the medium one or more second optical signals, the second set of optical signals resulting from a propagation of the first optical signal through the medium, mixing the second optical signal with a third optical signal to generate one or more mixed signals, obtaining one or more electrical signals from the mixed signal, and generating one or more point spread functions from the electrical signal.

In one embodiment, the one or more mixed signals can comprise a plurality of optical signals, and the mixing and obtaining steps can correspond to a single quadrature heterodyne down conversion, single-quadrature homodyne down conversion, dual quadrature heterodyne down conversion, or dual quadrature homodyne down conversion to generate the electrical signal.

In one embodiment, the one or more first optical signals can be generated from a demultiplexing of the modulated light according to optical wavelength-division demultiplexing, time-division demultiplexing, spatial-division demultiplexing, frequency-division demultiplexing, polarization-division demultiplexing, code-division demultiplexing or any combinations thereof. In one embodiment, the one or more second optical signals can be multiplexed according to optical wavelength-division multiplexing, time-division multiplexing, spatial-division multiplexing, frequency-division multiplexing, polarization-division multiplexing, code-division multiplexing, or any combinations thereof.

In one embodiment, the one or more first optical signals can be generated from a multiplexing of the modulated light, and the one or more second optical signals can be further demultiplexed, wherein the multiplexing and demultiplexing can be performed in an electrical domain, in an optical domain, or a combination thereof. In one embodiment, the multiplexing and demultiplexing can be performed in an electrical domain, in an optical domain, or a combination thereof.

In one embodiment, the one or more second optical signal can be substantially incoherent or substantially unpolarized. In one embodiment, the one or more point spread functions can each be derived from properties of the second optical signal, the properties including magnitude, phase, polarization, or combinations thereof. In one embodiment, the one or more point spread function can comprise a causal time-domain response.

In one embodiment, the method can further include extracting one or more characteristics of the medium from the one or more point spread functions, wherein the characteristics of the medium include an absorption, dispersion, scattering, diffusion, non-linearity or any combinations thereof.

In one embodiment, the method can further include calculating a correlation function of the one or more characteristics. In one embodiment, the method can further include calculating a spectrum of variation of the one or more characteristics. In one embodiment, the method can further include calculating a temporal variation of phase of the one or more characteristics. In one embodiment, the method can further include calculating a temporal variation of polarization of the one or more characteristics.

In one embodiment, the light can be supplied by a plurality of optical sources with distinct wavelengths. In one embodiment, the modulation can be applied to the light generated by the plurality of optical sources. In one embodiment, each of the plurality of optical sources can have a same or substantially similar modulation.

In one embodiment, the one or more point spread functions represent effects caused by the medium at the distinct optical wavelengths of the plurality of optical sources. In one embodiment, the one or more electrical signals can be converted to digital signals. In one embodiment, the one or more point spread functions can be generated by performing digital signal processing on the digital signals. In one embodiment, at least a portion of the digital signal processing can be performed in an application-specific integrated circuit (ASIC) or field-programmable gate array (FPGA).

In one embodiment, the one or more point spread functions can be represented by a Fourier transform. In one embodiment, a biasing signal can be present in the medium to provide conditioning or contrast. In one embodiment, the one or more electrical signals can operate at a bandwidth ranging from 1 GHz to 100 GHz. In one embodiment, the medium can be living or dead tissue.

In one embodiment, the one or more mixed signals can comprise one or more single quadrature homodyne optical signals. In one embodiment, the one or more mixed signals can comprise one or more single quadrature heterodyne optical signals. In one embodiment, the one or more mixed signals can comprise one or more dual quadrature heterodyne optical signals. In one embodiment, the one or more mixed signals can comprise one or more dual quadrature homodyne optical signals. In one embodiment, the one or more first optical signals can comprise a plurality of optical signals. In one embodiment, the one or more second optical signals can comprise a plurality of optical signals. In one embodiment, the one or more third optical signals can correspond to one or more local oscillators.

One or more aspects of the subject disclosure include an apparatus having a processing system including a processor, and a memory that stores executable instructions that, when executed by the processing system, facilitate performance of operations. The operations can include generating one or more first optical signals by modulating light to form a broad substantially-coherent optical spectrum, launching the first optical signal into a medium that has a characteristic of being bulk and diffusing, receiving from the medium one or more second optical signals, the second set of optical signals resulting from a propagation of the first optical signal through the medium, mixing the second optical signal with a third optical signal to generate one or more mixed signals, obtaining one or more electrical signals from the mixed signal, and generating one or more point spread function from the one or more electrical signals.

One or more aspects of the subject disclosure include a non-transitory, machine-readable medium, comprising executable instructions that, when executed by a processing system including a processor, facilitate performance of operations. The operations can include a processing system including a processor, and a memory that stores executable instructions that, when executed by the processing system, facilitate performance of operations. The operations can include generating one or more first optical signals by modulating light to form a broad substantially-coherent optical spectrum, launching the first optical signal into a target medium that has a characteristic of being bulk and diffusing, receiving from the target medium one or more second optical signals, the second set of optical signals resulting from a propagation of the first optical signal through the target medium, mixing the second optical signal with a third optical signal to generate one or more mixed signals, obtaining one or more electrical signals from the mixed signal, and generating one or more point spread function from the one or more electrical signals. It will be appreciated that the target medium can comprise tissue, a solid material, gaseous material, or any combinations thereof.

It will be appreciated that the foregoing embodiments, can be combined with other imaging modalities such as, for example, X-ray imaging, MRI, PET Scan, etc.

Coherent Detection

Figure 10:
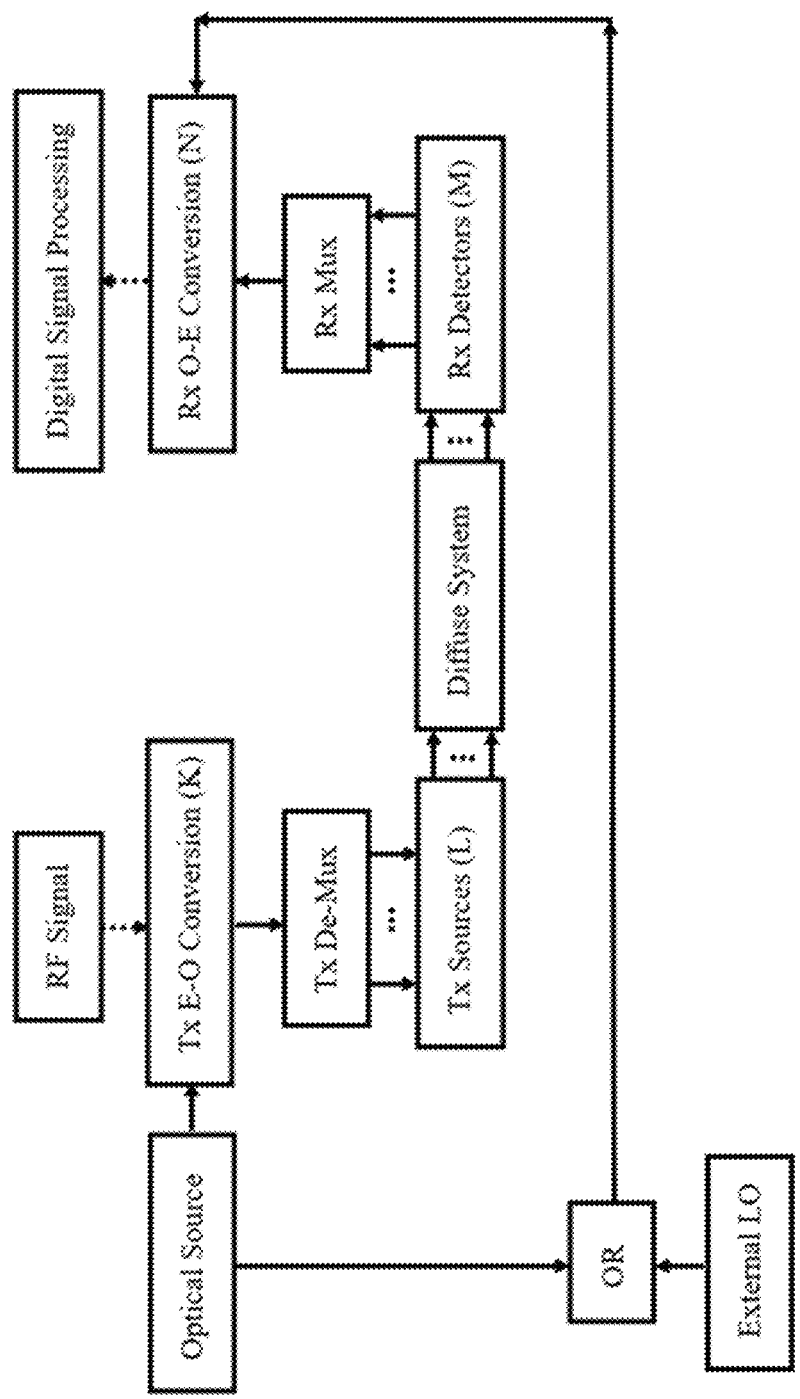
FIG. 10 is a block diagram illustrating an example, non-limiting embodiment of a local oscillator coherent detection-based configuration in accordance with various aspects described herein.

Generally, diffuse optical imaging techniques use slow intensity detectors (in the Rx O-E conversion block) due to their better sensitivity. Some techniques, such as OCT, use an optical heterodyne technique but rely on low coherence interferometry. We propose the use of coherent detection, benefitting from a high-power local oscillator (LO), to recover the intensity and/or phase information from the system. FIG. 10 demonstrates how a local oscillator may be added into a canonical SS-TD-DOS system. The local oscillator may originate from the transmit-side optical source or may be a second optical source. If the transmit-side optical source is used, the light may be frequency-shifted, attenuated, or used as a seed for optical locking in order to generate the local oscillator.

Figure 11:
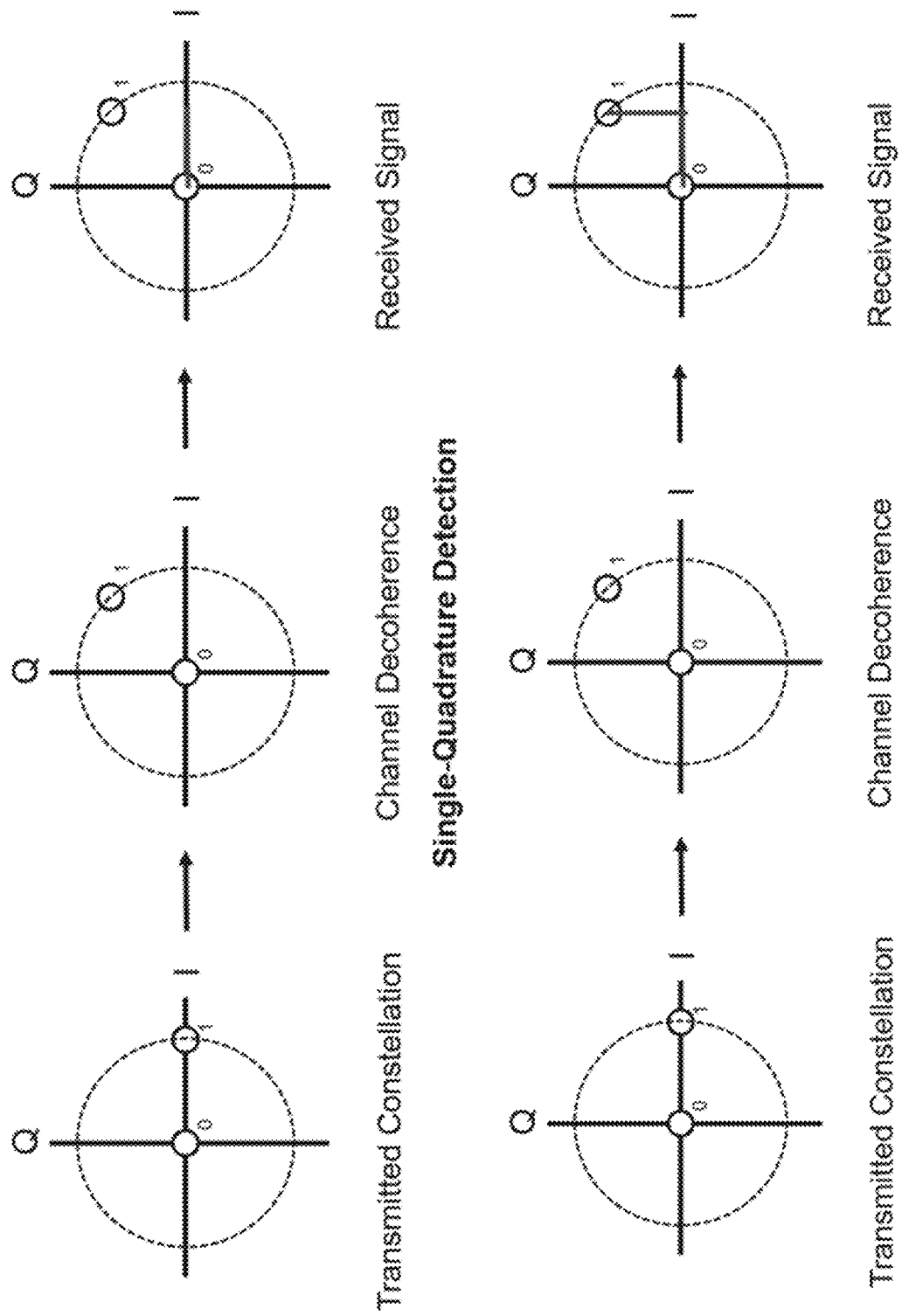
FIG. 11 is a block diagram illustrating an example, non-limiting embodiment of a comparison in I-Q plane between single-quadrature and dual-quadrature techniques in accordance with various aspects described herein.

FIG. 11 shows the difference between single-quadrature and dual-quadrature detection for an On-Off Keyed (OOK) input random bit sequence. Due to scattering in the diffuse medium, the received phase of an electric field can be shifted to many other points in the I-Q plane. It is also possible to use both higher-dimensional modulation (such as quadrature amplitude modulation (QAM) or pulse amplitude modulation (PAM) formats) for high SNR applications or shifted constellations (say OOK with a carrier offset) in order to retain phase information even for the lowest power point in the transmitted constellation.

FIG. 10 demonstrates one embodiment of a system for performing multiplexed coherent spread-spectrum optical spectroscopy. The RF signal is typically a pseudo-random bit sequence (PRBS), sometimes a maximal length sequence (MLS), but can be any signal take from an orthogonal class of sequences. The RF signal may be a single stream of information or it may be several delayed or orthogonal signals used for E-O conversion. The resulting optical signal is then de-multiplexed to L transmit sources. The de-multiplexing stage can be either all-pass, passive splitting, amplification with passive splitting (below skin safety maximum if applicable), wavelength de-multiplexing, or a combination thereof. Also, this stage may contain optical delay lines to decorrelate different optical paths. The result is a set of L optical sources that are incident to the diffuse optical system.

Also referencing FIG. 10, after the diffuse system, which may be used in a transmission-mode or reflectance-mode geometry, there are M detectors to collect incident light. This light is multiplexed into fewer or the same number of optical paths, which may include passive combining, passive combining with amplification, wavelength multiplexing, or a combination thereof. This stage may also include optical delay lines. These N optical paths are then converted to the electrical domain in the Rx O-E conversion block, which may detect one or multiple optical frequencies. The resulting electrical signals are then sent to a digital signal processor for matched filtering and additional processing.

It is advantageous to use a complementary metal-oxide semiconductor (CMOS) ASIC that is designed to also support coherent digital optical transmission of, for example 1.6 Tb/s via 200 GBaud. This ASIC may be used for the generation of an electrical signal to drive the modulator(s) and may be used within the determining of the point spread function. It is advantageous to use electro-optic components or packages that are designed to also support this digital transmission, at similar or other wavelengths.

It is also possible to polarization multiplex the input signal. Due to significant decoherence in the channel it can be difficult to reconstruct the transmit polarization state. However, orthogonal MLSs can be used on each polarization to reconstruct the signal in a dual-polarization coherent receiver.

Finally, dual-quadrature coherent detection allows the temporal tracking of phase information in the receiver. By examining phase fluctuations between samples, it is possible to extract information about the scattering coefficient of the different layers of tissue. After detection and demodulation, phase information can be gathered analogously to a TPSF. The temporal variation in phase can be analyzed to determine the degree of scattering for various photon paths, potentially requiring a detailed calibration of the instrument with a phantom.

Frequency-Domain Multiplexing

Certain techniques may involve temporal or spatial multiplexing to increase the number of parallel detection channels. Frequency-domain multiplexing (FDM), which is made feasible by high-bandwidth coherent detection, can be used to either increase the SNR of a single source-detector channel or enable additional spatial multiplexing.

Figure 12:
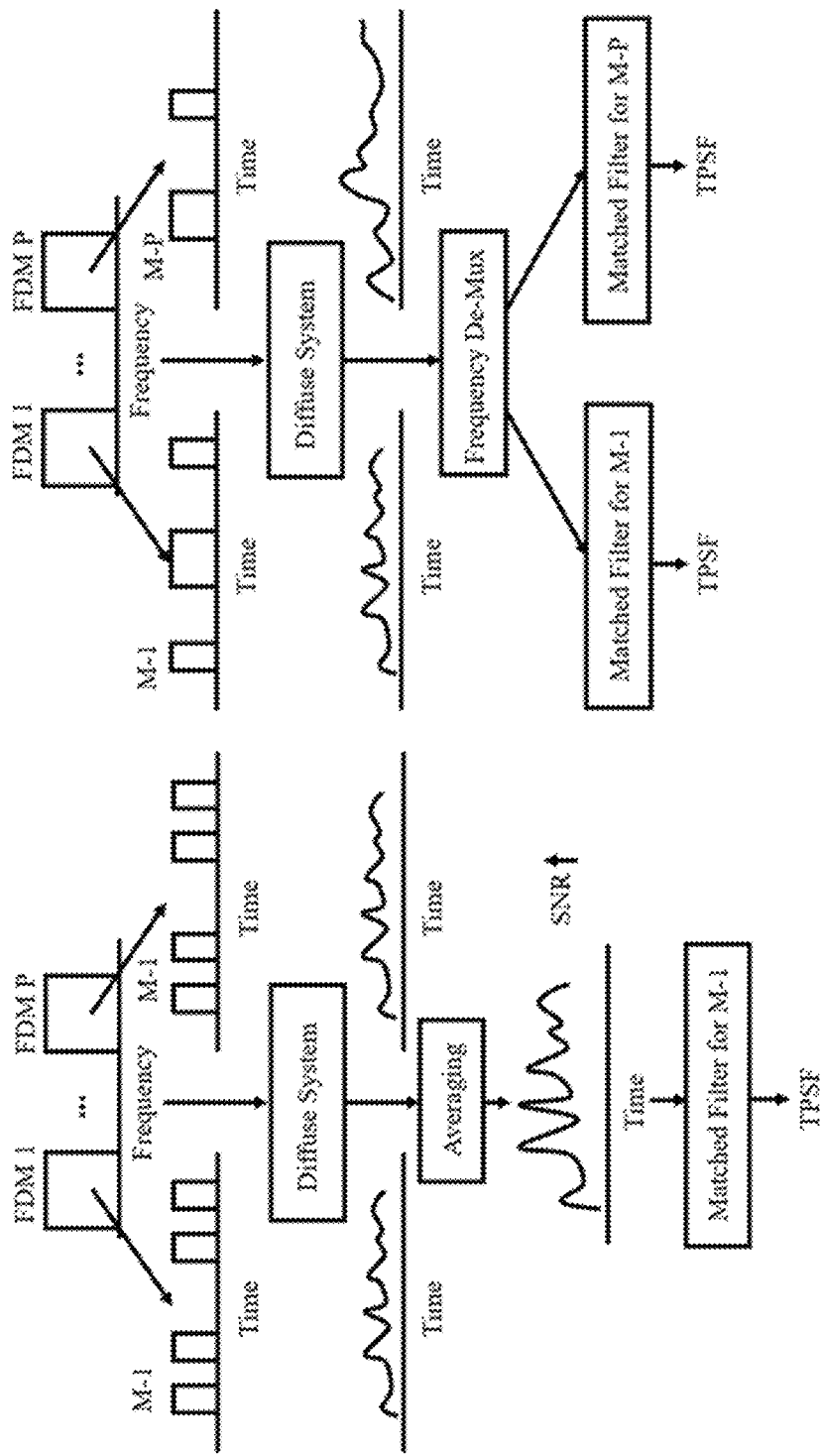
FIG. 12 is a block diagram illustrating an example, non-limiting embodiment of FDMs (left) used to increase the SNR of the TPSF single source-detector pair via averaging, and different FDMs (right) containing orthogonal MLSs and being filtered by separate matched filters to recover the respective TPSFs in accordance with various aspects described herein.

First, the SNR of a channel can be increased by averaging, as shown in the left figure in FIG. 12. In the simplest example, averaging sequential sampled MLSs in the receiver will reduce the noise floor. With FDM, this may be done without a reduction in speed because the channels are done in parallel in the receiver. Since a diffuse channel for tissue frequently acts as a low pass filter with bandwidth on the order of 1 GHz, many parallel FDM channels may be detected simultaneously with a high-speed receiver and then averaged to increase the SNR without sacrificing speed.

In addition, FDMs increase the multiplexing capability of a SS-TD-DOS system. For example, for systems where the number of detectors is much smaller than the number of transmitters, the receiver bandwidth can be shared between multiple transmitters using FDM, shown in the rightmost figure in FIG. 12. This allows for an increase in number of parallel channels without increasing the acquisition time. Both of these techniques may be used with direct detection or coherent detection.

Figure 13:
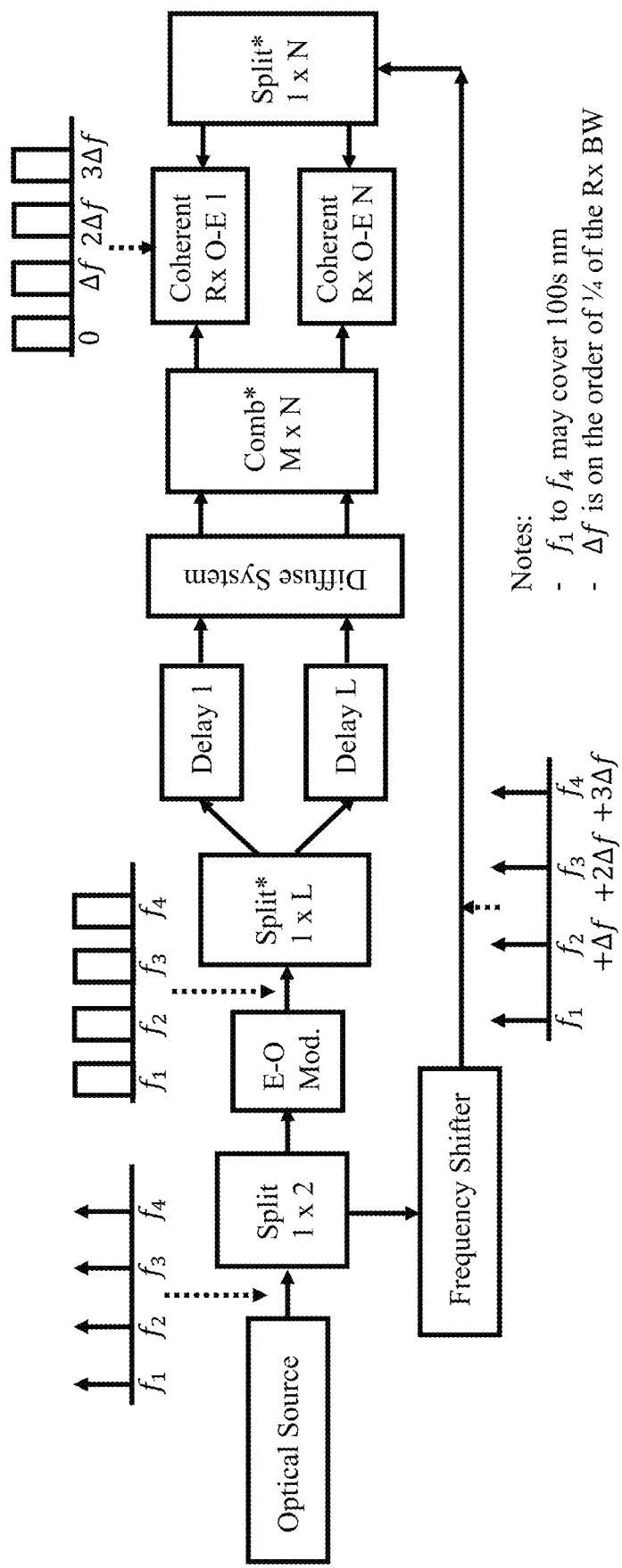
FIG. 13 is a block diagram illustrating an example, non-limiting embodiment of an FDM implementation that exploits FDMs to increase the number of spatial paths analyzed in accordance with various aspects described herein.

This idea can be extended further with coherent detection in the configuration shown in FIG. 13, where a system is shown that uses a multi-wavelength optical source to transmit across a diffuse channel. Each of the optical frequencies, which may cover the entire NIR window (or some subset), are bulk modulated and optically delayed to decorrelate the optical paths across the diffuse medium. At the receiver, after a multiplexing stage represented by a combiner, the signals are sent to a coherent receiver. In addition, some portion of the unmodulated optical frequencies are sent to a frequency shifter, which may be composed of one or more optical modulators that shift the center frequencies by different amounts. These shifted frequencies act as the receiver local oscillator such that when the optical signals are down-converted, each optical frequency is mapped onto a different FDM in the RF range, separated by $\Delta f$.

Alternatively, the local oscillator lasers for these frequencies can have shifted offsets relative to the transmit lasers.

Time-Multiplexed Coding Scheme

Previous spread-spectrum techniques typically involve uploading a known PRBS or MLS to a transmitter and then using that same sequence in a fixed autocorrelation filter in the receiver. This allows one receiver to discriminate between one matched transmitted sequence and background noise, which may include other modulated sequences. We propose the use of a time multiplexed coding scheme, coupled with a calibration procedure to optimize the channel for speed and a flexible number of source-detector paths.

Figure 14:
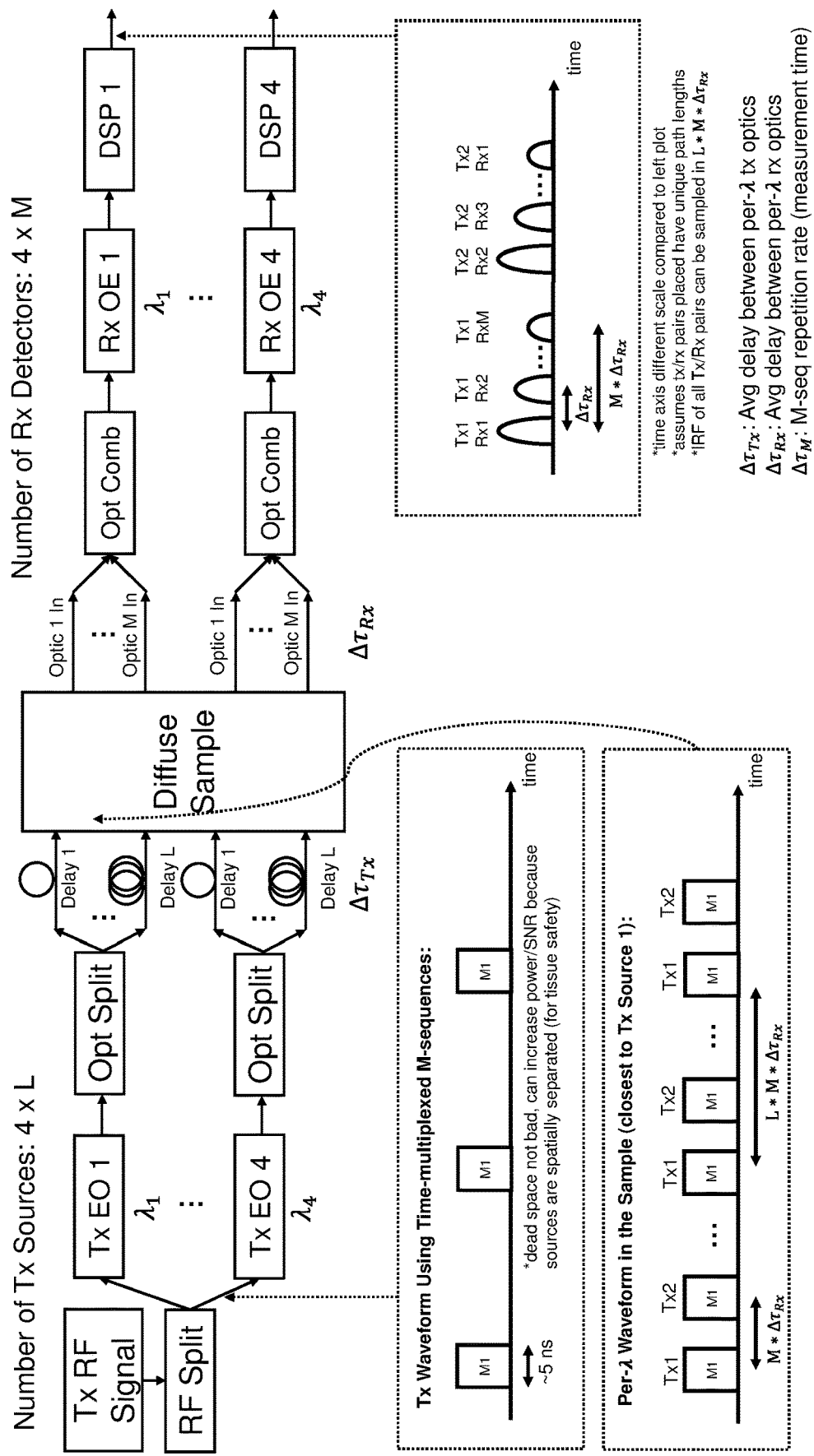
FIG. 14 is a block diagram illustrating an example, non-limiting embodiment of a time-multiplexed SS-TD-DOT system that can be calibrated based on the diffuse channel to efficiently use the entire channel and receiver bandwidth in accordance with various aspects described herein.

One such time-multiplexed SS-TD-DOT system is shown in FIG. 14. This system uses 4 separate optical wavelengths, corresponding to 4 separate lasers and detectors. The applied RF signal is a PRBS followed by zero transmission. After E-O conversion, the optical signals are delayed, passed through the diffuse channel, and then re-combined before being collected on detectors. Note that optical amplification stages may be required in front of or following the optical splitting and combining stages. After detection, the signals are then processed in the methods described above (not shown in FIG. 14). This diagram shows an ideal setup where the sources and detector path lengths are unambiguous (after fixed and constant optical delays). However, for different diffuse systems and source-detector arrangements, it is possible to have interference between multiple sources and a single detector, requiring calibration.

First, the system is calibrated to determine the mean time-of-flight (ToF) between each desired source and receiver pair. Without loss of generality, this system can be reduced to a single system with multiple sources and a single detector. A calibration procedure that can accomplish this may involve turning off all but one source and computing the TPSF at each detector. If every source-detector pair is sufficiently distinct from one another (i.e. their resulting TPSFs from a single PRBS sequence do not significantly overlap in time), then they may be distinguished by a fixed autocorrelation filter in a receiver. However, if there is overlap between TPSFs resulting from different source-detector paths, then there is ambiguity in the resulting TPSF.

This ambiguity can first be corrected by time-delaying the PRBS in the ambiguous transmitters. This may be done in the optical domain, through for example, optical delay lines as shown in FIG. 14, or in the electrical domain. This will shift in time the corresponding TPSFs so they can be resolved by the fixed filter receiver.

If the channel TPSF is of comparable length, or larger than, the PRBS length, then time-shifting ambiguous sequences will still result in an overlap of the TPSFs. In this case, either dead space periods (zero light) can be inserted after sequences or additional orthogonal sequences can be added after the original sequence. FIG. 14 demonstrates the former case, which in some cases can allow an increased peak optical power (and thus SNR), while maintaining a fixed average optical power, which is important where tissue safety is a concern. In any of these cases, the length of the PRBSs and filters may be optimized to tradeoff between the SNR, speed, and number of spatial dimensions.

Measurement of Fluctuations of a TPSF

The techniques described above can be used uniquely in the field of diffuse correlation spectroscopy in order to improve the acquisition speed and/or temporal resolution of the speckle detected at the receiver. From the above SS-TD-DOS techniques, it is possible to extract the TPSF faster than techniques that utilize slower detection schemes like TC-SPCs. Moreover, traditional methods of DCS typically use intensity speckle to extract temporal fluctuations in the diffuse tissue. By reconstructing the temporal phase response of the diffuse system, which is enabled by the coherent detection scheme, it is possible in some configurations to detect temporal variations in the channel not detectable from a simple intensity detector.

In one embodiment, the generating the one or more point spread functions can be performed by matched filtering. In one embodiment, the matched filtering can utilize a conjugate time reversal of the demultiplexed signals. In one embodiment, the matched filtering can correlate the one or more multiplexed signals with the demultiplexed signals.

Optical Wavelength Multiplexing

The use of multiple wavelengths for diffuse optical spectroscopy allows for better estimation of the absorption and scattering coefficients of the imaged medium. Here, multiple wavelengths can be generated in a single optical materials, like optical frequency comb generation, or the wavelengths can be generated by separate optical materials, such as a bank of lasers. The separate optical wavelengths can be modulated directly or externally. They can be modulated with the same RF signal or different RF signals. The modulation may happen in the same external modulator, or they may be separately modulated. The transmitter-side multiplexing stage may combine (multiplex) or demultiplex multiplex wavelengths into one or many waveguides. These waveguides which preferentially are optical fibers, guide the light to the source emitter locations, which are placed next to the tissue. Multiple wavelengths may be contained in the same source emitter into the medium or they may be contained in their own separate source emitter. The demultiplexing stage on the receiver side may multiplex or demultiplex multiple wavelengths. The detection stage may be composed of detectors that only detect a single wavelength or may detect multiple wavelengths simultaneously.

Time Multiplexing

The use of time-multiplexing for DOS allows for quicker or better estimation of the point spread functions. Time multiplexing describes the use of distinct signals that are interleaved in time in some part of the signal chain. There are several locations in the signal chain where time multiplexing can be employed. The RF signals applied to distinct emitters, whether different wavelengths, FDMs, etc. may be time delayed to distinguish between them later in the receiver. Time-multiplexed optical waveforms may be contained in the same waveguide or in multiple waveguides. One example of using multiple waveguides to time-multiplex signals is shown in FIG. 14, where optical delays are applied to the same optical signal before transmission into the medium so they can be distinguished in time by different detectors. Time multiplexing may be done on the transmitter side (as in FIG. 14) or on the receiver side via optical delay line. The detectors used here are naturally suited for time-division multiplexing due to their sampling in time, which allows different signals to be detected sequentially in time.

Processing of the waveforms over time is naturally suited to time-division multiplexing because the process of matched filtering sequentially processes waveforms to produce point spread functions. As shown in FIG. 14, calibration may be necessary to ensure that time-multiplexed signals of the same optical frequency do not overlap.

Spatial Multiplexing

The use of spatial multiplexing is primarily useful for creating a three-dimensional picture of the observed medium. Spatial multiplexing can be achieved by utilizing different numbers of sources emitters and extractors positioned around the medium being tested. This is shown by the 4×L sources and 4×M detectors in FIG. 14.

Frequency Division Multiplexing

Frequency division multiplexing can be used to make multiple measurements of the same or different point spread functions. FDM can be implemented in the RF signal applied in the modulation stage. FDM creates multiple independent signal streams on the same optical wavelength which can be detected by the receiver. This is not a preferred method for use with intensity detection, where the use of FDMs is difficult, though not impossible.

Quadrature Multiplexing

For completeness we've included discussion of quadrature multiplexing and polarization multiplexing. An optical field is typically composed of 4 orthogonal dimensions, such as: intensity and phase, for each polarization. Typically, multiplexing information between the intensity and phase is called quadrature multiplexing (or dual-quadrature transmission/detection). In addition to the typical intensity detection, modulation can be encoded in the phase. This modulation is typically done in a coherent transmitter configuration. Similarly, detecting the phase of an optical signal can be done with a dual-quadrature coherent receiver. One issue with quadrature-multiplexed schemes for measuring diffuse media is that scattering changes the phase of the light, which obscures and blurs the modulation in that dimension Polarization Multiplexing Optical signals can be composed of two orthogonal and independent polarizations. Optical signals can thus be encoded with different (or the same) signal on each of these polarizations before being transmitted into the medium. Polarization multiplexing can be achieved by a polarization-diverse modulator where, after generation, the optical signals are split and rotated into the two dimensions, modulated, and then recombined. Similarly, in the receiver, the received optical signals are split separately into the two polarizations and detected independently. One issue with polarization-multiplexed schemes for measuring diffuse media is that scattering changes the polarization state of the light, which combines and obscures the separately encoded information on the two polarizations.

Other Embodiments of the Subject Disclosure

A point spread function is conveniently a causal time-domain impulse response, $r(t-\tau)$, where $\tau$ is the minimum delay. $r(t-\tau)$ can be real, such as with an amplitude response to an amplitude stimulation. A point spread function can comprise a phase response, or a complex response. A point spread function can be a dual-polarization vector response to a single-polarization stimulus, or a matrix response to a dual-polarization stimulus.

A point spread function can be represented in ways that change the literal representation but contain substantially the same information, for example as a step response or as a response to other stimulus shapes, or as a transformation.

A point spread function can be considered in the frequency domain, for example as the conjugate-symmetric Fourier transform of a real time-domain impulse response. Other mathematical representations can be used to capture and process the information of the point spread function.

A point spread function can be considered in transformed domains such as the Laplace domain, $\int_\tau^\infty r(t)e^{-st}dt$, exploiting its causal nature.

A point spread function can be represented as a probability function, for example a histogram, a density, a distribution, a set of moments, or a characteristic function. A point spread function can have fine time-granularity, or can be quantized or binned into a smaller number of time intervals. Process coefficients, a process transition matrix, or transition function can be used to represent a point spread function, where for example the diffuse propagation is modelled as a random process.

A point spread function can be a single measurement, an averaged or filtered measurement, or a sequence of sets. Processing can be applied to the point spread function to extract features. A simple keratosis of a histogram could be calculated. For a more intricate example, the time-correlation of specific features of each set of a sequence of sets comprising a point spread function can be used to determine the velocity of blood flow.

The bulk diffuse medium is advantageously human tissue. Other biological or chemical mediums may be usefully measured. Examples of mediums are solid, fluid, colloid, mist, gas, or plasma. Examples of the bulk aspect are unconfined propagation within three dimensions, or where the propagation comprises reflections from a two-dimensional surface. Examples of diffusing three-dimensional medium are crystals, inhomogeneous solids, colloids, mists, smoke, turbulent density variations, and turbid liquids. The diffusion from a two-dimensional surface could be due to texture or pixelation.

The diffusion causes various delays in the time of the extracted signal. The medium may have substantial depth, where minimum (zero-diffusion) delay for optical paths that traverse part of that depth are substantially greater than for shallow paths.

At the relevant timescale, diffuse propagation is distinct from free-space or under-water propagation of a communications or lidar signal through diffraction and attenuation elements in that with a diffusing medium there is not a dominant wavefront.

The modulation of the broad-spectrum optical signal to be launched advantageously comprises the modulation of light from a narrow-spectrum laser with an electrically-driven modulator. This modulator may be an external device, or a device grown beside or with the laser. The light source may be directly modulated. A plurality of light sources of distinct wavelengths may be used with distinct, or common, or time-delayed modulations. The light may be delayed or amplified before being launched into the medium.

Light is advantageously launched from and extracted into single-mode optical fibers. Multi-mode and/or multicore optical fibers may be used. Other propagation paths such as bulk optics, waveguides, photonic crystals, or plasmonics may be used for launching or extracting.

The optical signal extracted from the medium can be a portion of the photons launched into the medium. This advantageously allows the point spread function to be substantially linear. An optical or electrical offset can make the function affine. Optical or electrical nonlinearities can make the point spread function nonlinear. Optical examples: Raman, Kerr, stimulated emission, or fluorescence effects. Electrical examples: clipping, quantizing, squaring, mixing, distorting. Optical nonlinearities may arise from atomic effects, molecular effects, phonon effects, or Doppler.

There may be a biasing signal present in the medium to provide conditioning or contrast. For example, an E-field, H-Field, optical pump, or phonons. The biasing signal may be the velocity of elements that are liquid, gas, solid layers, cells, or particles. The biasing signal may be temperature or chemical changes. The bias signal may be detrimental, incidental, beneficial, or deliberately introduced.

The local oscillator signal (LO) that is mixed with the extracted signal is advantageously derived from the same light source that is passed to the modulator. Other examples of LO signals are a portion of the modulated signal, light from a second laser, or the output of a second modulator. The LO may be composed of a plurality of widely separated wavelengths that each have specific offsets from the corresponding wavelength that is passed to the modulator.

The electrical beat signal advantageously has a bandwidth of greater than 10 GHz and a nearly white spectrum. The electrical spectrum may be non-white, such as being composed of FDM elements, segmented, band-pass, or shaped. The electrical bandwidth may be greater than 50 GHz, advantageously is 100 GHz.

Figure 15:
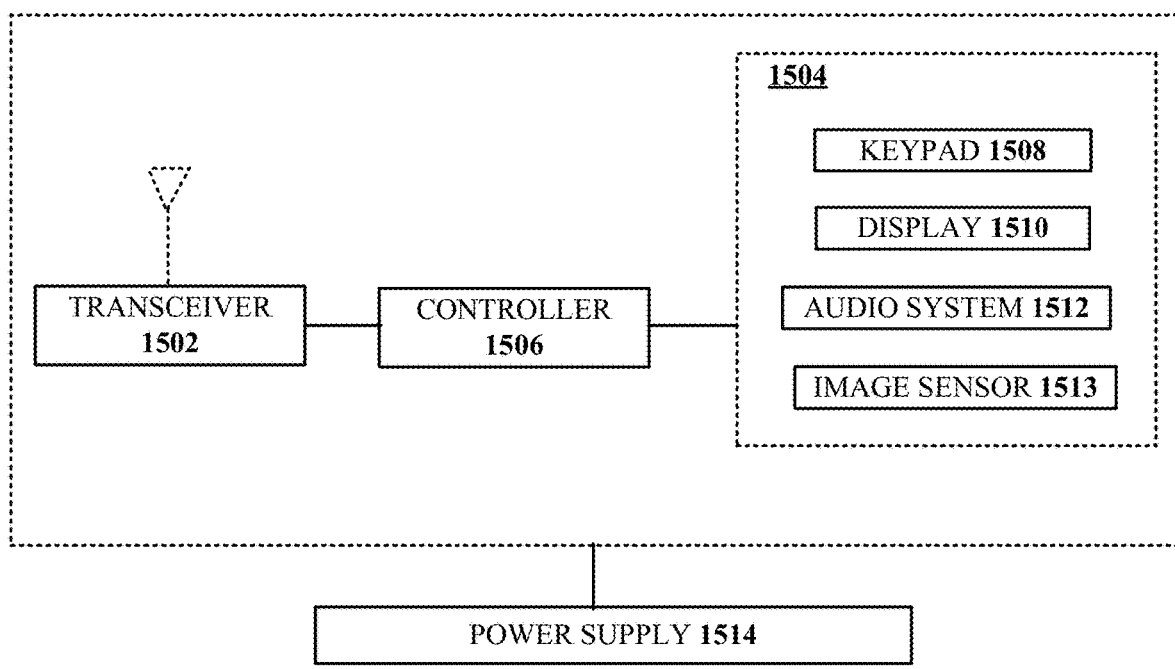
FIG. 15 is a block diagram of an example, non-limiting embodiment of a communication device in accordance with various aspects described herein.

Turning now to FIG. 15, an illustrative embodiment of a communication device 1500 is shown. Although not shown, the communication device 1500 of FIG. 15 can be adapted with any of the features depicted in FIGS. 10-14 (e.g., lasers, multiplexers, demultiplexers, etc.).

The communication device 1500 can comprise a wireline and/or wireless transceiver 1502 (herein transceiver 1502), a user interface (UI) 1504, a power supply 1514, and a controller 1506 for managing operations thereof. The transceiver 1502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1502 can also be adapted to support circuit-switched wireline access technologies (such as PSTN), packet-switched wireline access technologies (such as TCP/IP, VoIP, etc.), and combinations thereof.

The UI 1504 can include a depressible or touch-sensitive keypad 1508 with a navigation mechanism such as a roller ball, a joystick, a mouse, or a navigation disk for manipulating operations of the communication device 1500. The keypad 1508 can be an integral part of a housing assembly of the communication device 1500 or an independent device operably coupled thereto by a tethered wireline interface (such as a USB cable) or a wireless interface supporting for example Bluetooth®. The keypad 1508 can represent a numeric keypad commonly used by phones, and/or a QWERTY keypad with alphanumeric keys. The UI 1504 can further include a display 1510 such as monochrome or color LCD (Liquid Crystal Display), OLED (Organic Light Emitting Diode) or other suitable display technology for conveying images to an end user of the communication device 1500. In an embodiment where the display 1510 is touch-sensitive, a portion or all of the keypad 1508 can be presented by way of the display 1510 with navigation features.

The display 1510 can use touch screen technology to also serve as a user interface for detecting user input. As a touch screen display, the communication device 1500 can be adapted to present a user interface having graphical user interface (GUI) elements that can be selected by a user with a touch of a finger. The display 1510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1510 can be an integral part of the housing assembly of the communication device 1500 or an independent device communicatively coupled thereto by a tethered wireline interface (such as a cable) or a wireless interface.

The UI 1504 can also include an audio system 1512 that utilizes audio technology for conveying low volume audio (such as audio heard in proximity of a human ear) and high-volume audio (such as speakerphone for hands free operation). The audio system 1512 can further include a microphone for receiving audible signals of an end user. The audio system 1512 can also be used for voice recognition applications. The UI 1504 can further include an image sensor 1513 such as a charged coupled device (CCD) camera for capturing still or moving images.

The power supply 1514 can utilize common power management technologies such as replaceable and rechargeable batteries, supply regulation technologies, and/or charging system technologies for supplying energy to the components of the communication device 1500 to facilitate long-range or short-range portable communications. Alternatively, or in combination, the charging system can utilize external power sources such as DC power supplied over a physical interface such as a USB port or other suitable tethering technologies.

The controller 1506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1500.

All subject matter in the attached appendices is incorporated herein by reference and any embodiments in the appendices can be combined in whole or in part with the subject disclosure.

The terms "first," "second," "third," and so forth, as used herein, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices. Some of the embodiments described herein can also employ artificial intelligence (AI) to facilitate automating one or more features described herein. Classification as used herein also is inclusive of statistical regression that is utilized to develop models of priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system comprising components that perform operations, the operations comprising:
   receiving, by a receiver component and from a medium, one or more second optical signals resulting from a propagation of one or more first optical signals through the medium, wherein one or more optical sources output first light that traverses a first path in which the first light is modulated by a data signal to generate the one or more first optical signals, wherein the one or more optical sources further output second light that traverses a direct path to the receiver component without being modulated by a data signal and without being altered, wherein the one or more first optical signals have a broad substantially-coherent optical spectrum, wherein the one or more first optical signals are launched into the medium, and wherein the medium has a characteristic of being bulk and diffusing which causes the one or more second optical signals to have characteristics of a temporal point spread function (TPSF);
   mixing the one or more second optical signals with second light to generate one or more mixed signals;
   obtaining one or more electrical signals from the one or more mixed signals; and
   generating one or more point spread functions from the one or more electrical signals to extract characteristics of the TPSF.

2. The system of claim 1, wherein the one or more mixed signals comprise a plurality of optical signals, and wherein the mixing step and the obtaining step correspond to a single quadrature heterodyne down conversion, single quadrature homodyne down conversion, dual quadrature homodyne down conversion, or dual quadrature heterodyne down conversion to generate the one or more electrical signals.

3. The system of claim 1, wherein the one or more first optical signals are generated from a demultiplexing of the modulated light according to optical wavelength-division demultiplexing, time-division demultiplexing, spatial-division demultiplexing, frequency-division demultiplexing, polarization-division demultiplexing, code-division demultiplexing or any combinations thereof, and wherein the one or more second optical signals are multiplexed according to optical wavelength-division multiplexing, time-division multiplexing, spatial-division multiplexing, frequency-division multiplexing, polarization-division multiplexing, code-division multiplexing, or any combinations thereof.

4. The system of claim 1, wherein the one or more first optical signals are generated from a multiplexing of the modulated light, and the one or more second optical signals is further demultiplexed, and wherein the multiplexing and demultiplexing are performed in an electrical domain, in an optical domain, or a combination thereof.

5. The non transitory, machine readable medium system of claim 1, wherein the one or more second optical signals are substantially incoherent or substantially unpolarized, and wherein the one or more point spread functions each are derived from properties of the one or more second optical signals, the properties including magnitude, phase, polarization, or combinations thereof, and wherein the one or more point spread functions comprise a causal time-domain response.

6. The system of claim 1, wherein the operations further include
extracting one or more characteristics of the medium from the one or more point spread functions, wherein the characteristics of the medium include absorption, dispersion, scattering, diffusion, non-linearity or any combinations thereof, and
calculating a correlation function of the one or more characteristics, a spectrum of variation of the one or more characteristics, a temporal variation of phase of the one or more characteristics, a temporal variation of polarization of the one or more characteristics or any combinations thereof.

7. The system of claim 1, wherein the first light is supplied by a plurality of optical sources with distinct wavelengths, wherein the modulating step is applied to the first light generated by the plurality of optical sources, and wherein the distinct wavelengths of the first light undergo a same or substantially similar modulation.

8. The non transitory, machine-readable medium system of claim 7, wherein the one or more point spread functions represent effects caused by the medium at distinct optical wavelengths of the plurality of optical sources, and wherein the one or more point spread functions is generated by performing digital signal processing on the digital signals.

9. The system of claim 1, wherein the one or more electrical signals are converted to digital signals, and wherein at least a portion of digital signal processing of the digital signals is performed in an ASIC or FPGA.

10. The system of claim 1, wherein the one or more point spread functions are represented by a Fourier transform adapted to extract the TPSF.

11. The system of claim 1, wherein a biasing signal is present in the medium to provide conditioning or contrast.

12. The system of claim 1, wherein the one or more electrical signals operate at a bandwidth ranging from 1 GHz to 100 GHz.

13. The system of claim 1, wherein the medium is living or dead tissue.

14. The system of claim 1, wherein the one or more mixed signals comprise one or more single quadrature heterodyne optical signals, one or more single quadrature homodyne optical signals, one or more dual quadrature heterodyne optical signals, one or more dual quadrature homodyne optical signals or combinations thereof.

15. The system of claim 1, wherein the one or more first optical signals comprises a plurality of optical signals.

16. The system of claim 1, wherein the one or more second optical signals comprise a plurality of optical signals.

17. An apparatus, comprising:
a processing system including a processor; and
a memory that stores executable instructions that, when executed by the processing system, facilitate performance of operations, comprising
receiving, by a receiver in the processing system and from a medium, one or more second optical signals resulting from a propagation of one or more first optical signals through the medium, wherein one or more optical sources output first light that traverses a first path in which the first light is modulated by a data signal to generate the one or more first optical signals, wherein the one or more optical sources further output second light that traverses a direct path to the receiver without being modulated by a data signal and without being altered, wherein the one or more first optical signals have a broad substantially-coherent optical spectrum, wherein the one or more first optical signals are launched into the medium, and wherein the medium has a characteristic of being bulk and diffusing which causes the one or more second optical signals to have characteristics of a temporal point spread function (TPSF);
mixing the one or more second optical signals with the second light to generate one or more mixed signals;
obtaining one or more electrical signals from the one or more mixed signals; and
generating one or more point spread functions from the one or more electrical signals to extract characteristics of the TPSF.

18. The apparatus of claim 17, wherein the one or more mixed signals comprise a plurality of optical signals, and wherein the mixing step and the obtaining step correspond to a single quadrature heterodyne down conversion to generate the one or more electrical signals.

19. A method, comprising:
receiving, by a receiver and from a target medium, one or more second optical signals resulting from a propagation of one or more first optical signals through the target medium, wherein one or more optical sources output first light that traverses a first path in which the first light is modulated by a data signal to generate the one or more first optical signals, wherein the one or more optical sources further output second light that traverses a direct path to the receiver without being modulated by a data signal and without being altered, wherein the one or more first optical signals have a broad substantially-coherent optical spectrum, wherein the one or more first optical signals are launched into the target medium, and wherein the target medium has a characteristic of being bulk and diffusing which causes the one or more second optical signals to have characteristics of a temporal point spread function (TPSF);
mixing the one or more second optical signals with second light to generate one or more mixed signals;
obtaining one or more electrical signals from the one or more mixed signals; and
generating, based on matched filtering, one or more point spread functions from the one or more electrical signals to extract characteristics of the TPSF.

20. The method of claim 19, wherein the one or more mixed signals comprise a plurality of optical signals, and wherein the mixing step and the obtaining step correspond to a single quadrature heterodyne down conversion to generate the one or more electrical signals.

* * * * *